June 2, 1970  W. H. SOUTH ET AL  3,515,975
CURRENT TO VOLTAGE TRANSDUCER
Filed June 28, 1968  2 Sheets-Sheet 1

WITNESSES:
Bernard R. Gieguay
James F. Young

INVENTORS
William H. South &
Roger A. Dworak.
BY
Donald R. Lackey
ATTORNEY

United States Patent Office 3,515,975
Patented June 2, 1970

3,515,975
CURRENT TO VOLTAGE TRANSDUCER
William H. South, McKeesport, and Roger A. Dworak, Natrona Heights, Pa., assignors to Westinghouse Electric Corporation, Pittsburgh, Pa., a corporation of Pennsylvania
Filed June 28, 1968, Ser. No. 741,072
Int. Cl. H02m 3/22; H03b 7/08; G01r 19/26
U.S. Cl. 321—2                                      8 Claims

ABSTRACT OF THE DISCLOSURE

A DC current to AC voltage transducer circuit which utilizes a current shunt, a tunnel diode oscillator, and a transformer, to provide an AC voltage having a magnitude which is proportional to the magnitude of the DC current flowing through the current shunt.

BACKGROUND OF THE INVENTION

Field of the invention

The invention relates in general to electrical transducers, and more particularly to DC current to AC voltage tansducers.

Description of the pior art

Many applications require the measurement of DC currents with the resulting signal being used for such functions as regulating, indicating, controlling, limiting, auctioneering, and the like. It is usually desirable to be able to measure the magnitude of the DC current with as little power dissipation as possible, and when the current is being measured in a high voltage system, electrical isolation is desirable between the circuit in which the current is being measured, and the output circuit. In the prior art, circuitry for accomplishing these objectives has been costly and bulky. For example, electrical isolation is usually achieved by utilizing magnetic amplifiers. When the application requires detection of a specific current magnitude, special comparative circuitry is required, in addition to the circuitry required to obtain a measure of the DC current. Thus, it would be desirable to be able to provide a DC current to AC voltage transducer, which has an inherent threshold or triggering level, eliminating the need for additional comparative circuitry, which provides a linear AC voltage in response to DC current over a predetermined range, after triggering, and which provides electrical isolation between the input and output signals, without requiring the use of magnetic amplifiers.

SUMMARY OF THE INVENTION

Briefly, the present invention is a new and improved DC current to AC voltage transducer which utilizes a current shunt, a tunnel diode oscillator, and a transformer arrangement, which is capable of operating from the very low voltage drop across the current shunt, in the range of 50 to 250 millivolts. Thus, power dissipation in the shunt is minified. The tunnel diode oscillator starts to oscillate at a predetermined bias voltage. All the energy to sustain the oscillation comes from the bias voltage. Thus, an external power supply is not required. The sharp detection point at which the oscillator starts to provide an AC output signal may be used to provide a built-in threshold or triggering level for limiting purposes. Once the tunnel diode oscillator has been triggered into oscillation, the AC output voltage is linear with DC current through the shunt, over a predetermined range of voltage across the shunt, which signal may be applied through an electrical transformer to provide an isolated AC output signal suitable for use with an indicating instrument. The transformed AC output signal may be amplified in suitable amplifier circuitry, if desired, to obtain a signal magnitude suitable for control functions.

BRIEF DESCRIPTION OF THE DRAWING

Further advantages and uses of the invention will become more apparent when considered in view of the following detailed description and drawings, in which.

DESCRIPTION OF PREFERRED EMBODIMENTS

A tunnel diode is a two terminal P-N junction semiconductor device, typically formed of germanium, silicon, or gallium arsenide, which differs from the rectifying diode in that the amount of donor and acceptor impurities added to the tunnel diode semiconductor materials are approximately 1000 times greater than those added to semiconductor materials for fabricating the rectifying junction. This high impurity density in the tunnel diode results in a very narrow junction depletion region, which allows electrical charges to transfer across the junction by an action referred to as "tunneling." The tunneling effect results in a negative resistance region on the characteristic curve of a tunnel diode, which gives the tunnel diode the ability to oscillate when connected to a source of DC voltage (bias) and to a timing circuit (tank circuit).

Figure 1:
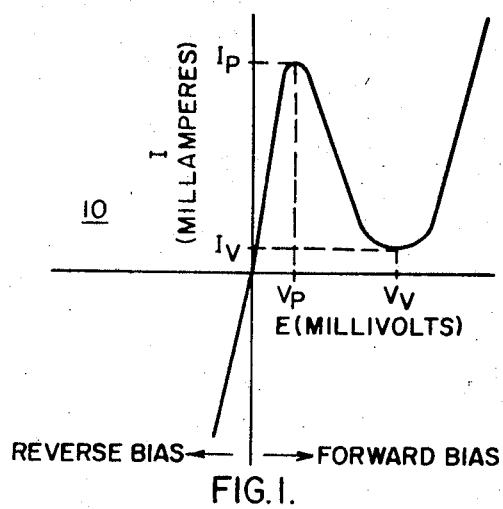
FIG. 1 is a graph which illustrates the current-voltage characteristic of a tunnel diode.

More specifically, FIG. 1 is a graph which illustrates a typical current-voltage characteristic curve 10 of a tunnel diode. Unlike a conventional diode, a tunnel diode begins to conduct as soon as a small forward bias is applied thereto, with the current increasing rapidly to a sharp maximum peak current $I_P$. The current then begins to decrease with increasing forward bias, dropping to a minimum current referred to as the valley current $I_V$, and then the current increases with further increased forward bias, finally simulating a conventional rectifier. When reverse bias is applied to a tunnel diode, a relatively large reverse bias current flows due to the valence electrons of semiconductor atoms near the junction tunneling across the junction from the p-type region to the n-type region.

The portion of the characteristic curve 10, between $I_P$ and $I_V$, wherein the current decreases with increasing forward bias, represents a negative resistance region which permits the use of the device as an oscillator.

An oscillator, using a tunnel diode, may be constructed by connecting a tunnel diode serially with a source of DC potential and energy storage means, such as a capacitor or inductor. This series resonant type of circuit has a frequency which is largely dependent upon the negative resistance of the tunnel diode, as well as its capacitance, both of which change as the bias changes. Thus, the series resonant oscillator has poor frequency stability. A parallel resonant oscillator, utilizing a series-parallel oscillator circuit comprising a tunnel diode and a source of bias potential connected serially with a resonant LC tank circuit, on the other hand, has a frequency which is largely dependent upon the constants of the tank circuit. Therefore, while the DC current to AC voltage transducer to be hereinafter described does not require a stable frequency for its operation, the parallel resonant circuit is generally preferred and will be used to describe the invention.

Figure 2:
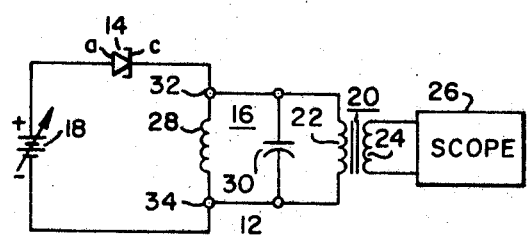
FIG. 2 is a schematic diagram of a tunnel diode oscillator and transformer circuit which may be used to determine the range over which the output voltage of the tunnel diode oscillator is linear with bias.

FIG. 2 is a schematic diagram of a tunnel diode oscillator 12, which includes a tunnel diode 14 connected in series with an LC tank circuit 16 and a source 18 of DC potential. A transformer 20 having primary and secondary windings 22 and 24, respectively, has its primary winding 22 connected across the tank circuit 16, and its secondary winding 24 connected to an oscilloscope 26. The tunnel diode 14 has anode and cathode electrodes $a$ and $c$, respectively, and it is connected to the source 18 of DC potential such that it will be forward biased. Thus, as shown in FIG. 2, tunnel diode 14 is poled to conduct current from its anode to cathode electrode, from the source 18, with its anode electrode $a$ being connected to the positive terminal of source 18. The LC tank circuit 16 has inductance and capacitance means 28 and 30, respectively, each connected between terminals 32 and 34. The tank circuit 16 is serially connected with tunnel diode 14 and source 18, with terminal 32 of the tank circuit 16 being connected to the cathode electrode $c$ of tunnel diode 14, and terminal 34 of tank circuit 16 being connected to the negative terminal of source 18.

Transformer 20 is connected to obtain a measure of the AC voltage developed across the tank circuit 16, with primary winding 22 being connected to terminals 32 and 34, and it steps up the voltage across the tank circuit and applies it to the vertical deflection input terminals of the oscilloscope 26. The oscilloscope indicates the peak-to-peak AC voltage appearing across the secondary winding 24 of transformer 20.

Figure 3:
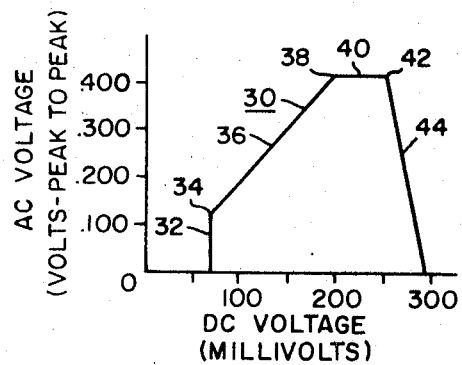
FIG. 3 is a graph of the transfer curve of the circuit shown in FIG. 2, which illustrates the threshold voltage of the circuit and the range over which the circuit may be utilized as a DC current to AC voltage transducer.

The graph shown in FIG. 3 plots the DC voltage of source 18 in millivolts on the abscissa, and the AC peak-to-peak output voltage, measured by the oscilloscope 26 with a 10K load, is plotted on the ordinate. The resulting curve 30 is the transfer curve of the circuit 12 shown in FIG. 2. For purposes of plotting the curve 30, the values of the tank circuit components were selected to provide an output frequency of 30 kHz.

It will be noted from studying the transfer curve 30 shown in FIG. 3, that the oscillator 12 shown in FIG. 2 does not provide an output signal until the tunnel diode 14 has a forward bias of approximately 70 millivolts applied thereto, at which point the circuit breaks into oscillation and provides a peak-to-peak AC output voltage at the oscilloscope of .125 volt. The transfer curve 30 rises sharply from zero along portion 32 of the curve to point 34. From point 34, as the forward bias is increased slowly, it will be noted that the magnitude of the AC output voltage increases linearly along portion 36 of the curve, until reaching point 38, which corresponds to a forward bias of approximately 200 millivolts. The curve then flattens between a forward bias of 200 and 250 millivolts, indicated by portion 40 of the curves, and at point 42 the AC peak-to-peak voltage decreases sharply to zero along portion 44 of the curve, reaching zero at about 275 millivolts forward bias.

This invention teaches how the characteristics of the tunnel diode oscillator, as exemplified by the transfer curve 30 shown in FIG. 3, may be used to provide a low cost DC current to AC voltage transducer, which dissipates very little power, and which provides electrical isolation between the input and output circuits. This invention also teaches how the characteristics of the tunnel diode oscillator may be used to provide limiting or pickup functions.

As hereinbefore stated, the output frequency of the circuit shown in FIG. 2 was selected, for purposes of example, to be 30 kHz. The specific values of the components used in the circuit 12 shown in FIG. 2 for making the transfer curve 30 shown in FIG. 3, are as follows:

Tunnel diode 14—1N3712
Inductance 28— 470 h., 4.2 ohms
Capacitance 30—.05 f.
Transformer 20—Sprague pulse transformer 31Z382
Source 18—Variable DC power supply with 25 ohms internal impedance.

The output frequency selected for the tunnel diode oscillator is critical only in the fact that it should not be too high. It has been found that the transfer curve no longer includes a portion in which the AC output voltage is linear with bias, when a frequency of about 10 megahertz is exceeded, and that best results are obtained between 10 kHz. and 50 kHz. The exact frequency in this range is not critical, and may be selected to reduce the physical size of the components. For example, at 10 kHz. the inductor becomes rather large physically.

Figure 4:
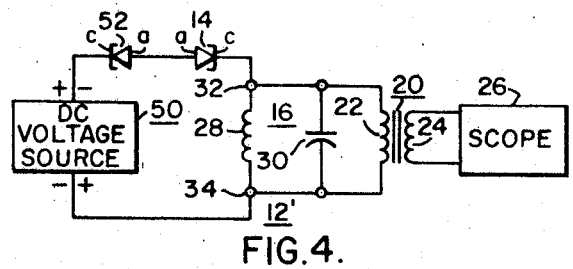
FIG. 4 is a schematic diagram of a tunnel diode oscillator and transformer circuit, illustrating how the circuit of FIG. 2 may be modified to make it responsive to both positive and negative DC currents.

While the circuit 12 shown in FIG. 2 provides a transfer curve having the desired characteristic only when the DC current flow in the circuit is in a predetermined direction, the characteristic of the tunnel diode in permitting current to flow upon reverse bias enables the circuit 12 shown in FIG. 2 to be modified, as shown in FIG. 4, to provide a circuit 12′ which is responsive to DC current flow in the circuit is in a predetermined direction. Like numerals in FIGS. 2 and 4 refer to like components. Specifically, the circuit 12 shown in FIG. 2 is modified, as shown in FIG. 4, by replacing the source 18 of DC potential with a source 50B, with the latter source being able to provide a DC output potential of either polarity, and it is further modified by adding a second tunnel diode 52, which is connected serially with tunnel diode 14, but which is poled oppositely thereto.

Figure 5:
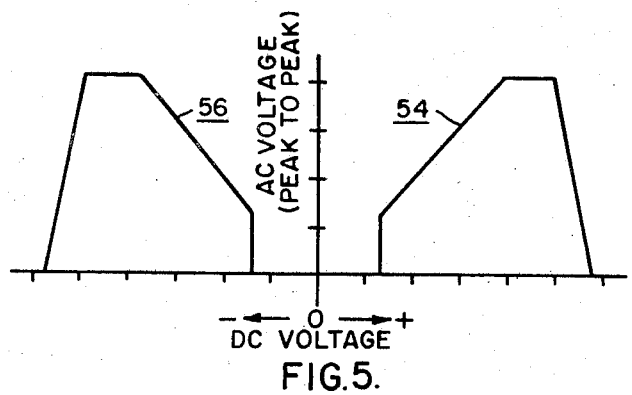
FIG. 5 is a graph of the transfer curve of the circuit shown in FIG. 4, illustrating the range over which the circuit may be utilized as a DC current to AC voltage transducer.

FIG. 5 is a graph which illustrates the transfer curve of the circuit 12′ shown in FIG. 4. The transfer curve includes first and second portions 54 and 56, respectively, with portion 54, which is similar to curve 30 shown in FIG. 3, being developed in response to the forward biasing of tunnel diode 14. Portion 56 is similar to portion 54, except for being responsive to a negative DC voltage, and it is developed in response to the forward biasing of tunnel diode 52.

Figure 6:
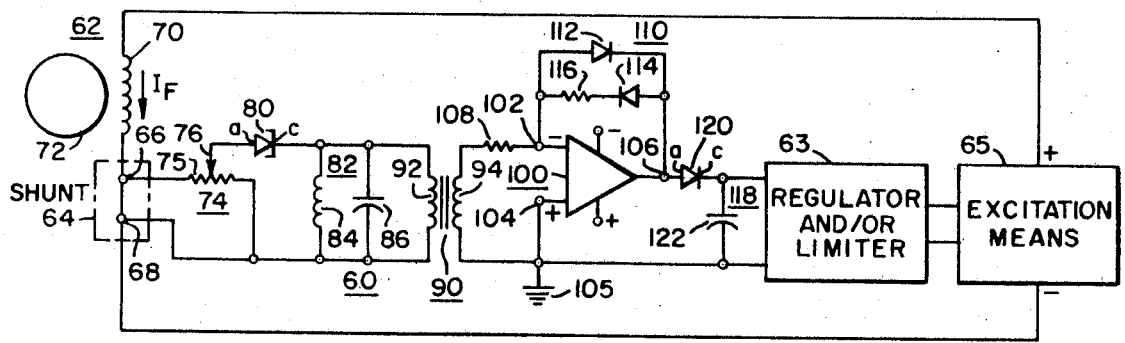
FIG. 6 is a schematic diagram of a current transducer which illustrates the circuit shown in FIG. 2, adapted to provide limiting and/or regulating functions, for a dynamoelectric machine, wherein the field voltage has a predetermined fixed polarity.

FIG. 6 illustrates a DC current to AC voltage transducer circuit 60, constructed according to the teachings of the invention, and applied to the field circuit of a dynamoelectric machine 62. In this instance, transducer 60 is used with a current regulator and/or a limiter circuit 63, and excitation means 65, to control and/or limit the field current $I_F$ of the dynamoelectric machine 62. The very low bias voltages required to operate the transducer 60 enables a voltage signal proportional to the DC current to be measured to be obtained by connecting a low resistance current shunt 64 in series with the conductor carrying the DC current. The resistance of the current shunt 64 is selected to provide a voltage drop across its terminals 66 and 68 which will be in the desired range for biasing the tunnel diode in its negative resistance range.

More specifically, FIG. 6 includes a dynamoelectric machine 62, such as an AC or DC generator, having a field winding 70 and an armature 72, with the field winding 70 being serially connected with the current shunt 64 and the output terminals of exciter means 65. Exciter means 65 may be of the static, semiconductor type, for example, including controlled rectifiers in a bridge arrangement, and the firing means therefor of the phase shifter type. However, any other suitable excitation means may be utilized. U.S. Pat. 3,211,987, issued Oct. 12, 1965, which is assigned to the same assignee as the present application, discloses excitation means which may be used.

An adjustable resistor or potentiometer 74 having a resistive portion 75 and an adjustable arm 76, may be used to adjust the threshold level of the transducer 60. Resistive portion 75 is connected across the terminals 66 and 68 of the current shunt 64. The adjustable arm 76 of potentiometer 74 is serially connected with a tunnel diode 80 and a tank circuit 82, to the end of the resistive portion 75 which is connected to terminal 68 of the current shunt 64. Tunnel diode 80 includes an anode electrode $a$ and a cathode electrode $c$, with the anode electrode $a$ being connected to adjustable arm 76 and with its cathode $c$ being connected to one end of the tank circuit 82. The other end of the tank circuit 82 is connected to terminal 68 of the current shunt 64. Tank circuit 82 includes inductance and capacitance means 84 and 86, respectively, as hereinbefore described relative to FIG. 2. The AC voltage developed in tank circuit 82 is transformed in transformer 90, which has a primary winding 92 connected across the terminals of the tank circuit 82, and a secondary winding 94 which may be connected to suitable amplifier means 100. Thus, even though the field circuit of the dynamoelectric machine 62 may be at an elevated DC potential, the voltage appearing in the secondary winding 94 of transformer 90 will be a relatively low value.

Amplifier means 100 may be any type of amplifier, such as the operational amplifier shown, having input terminals 102 and 104 and an output terminal 106. One side of the secondary winding 94 of the transformer 90 is connected to terminal 102 of amplifier means 100 through a suitable resistor 108, and the other side of secondary winding 94 is connected to input terminal 104 of amplifier means 100 and to ground 105. The output terminal 106 of operational amplifier means 100 is connected through a negative feedback circuit 110 to its input terminal 102. Feedback circuit 110 includes diodes 112 and 114, and a resistor 116. Diode 114 and resistor 116 are serially connected between terminals 106 and 102, with diode 114 being poled to conduct current in the direction from terminal 106 to terminal 102, and diode 112 is connected between terminals 102 and 106, and poled oppositely to diode 114. The amplified signal, which may now be in the order of 50 times greater than the magnitude appearing at the secondary winding 94, may be rectified and filtered in circuit 118, which includes a diode 120 and a capacitor 122. Diode 120 has anode and cathode electrodes $a$ and $c$, respectively, with its anode electrode $a$ being connected to output terminal 106 and its cathode electrode $c$ being connected to the regulator and/or limiter 63. Capacitor 122 is connected from the cathode electrode $c$ of diode 120 to ground 105. If circuit 63 is used only as a limiter for controlling the maximum field current $I_F$, circuit 63 will provide a signal when the voltage across potentiometer 74 reaches the threshold voltage of the tunnel diode oscillator circuit 60. This signal, when applied to excitation means 65, through a suitable auctioneering or logic circuit, may then be used to clamp the maximum field current. If circuit 63 is used as a field current regulator, circuit 63 will provide a continuous unidirectional output signal which is used by excitation means 65 to adjust the magnitude of the field current $I_F$. For example, the magnitude of the output signal from circuit 63 may be used to adjust the firing angle of firing circuit pulses applied to controlled rectifiers arranged in a bridge configuration. Thus, as illustrated in the embodiment of the invention shown in FIG. 6, regulating and/or limiting functions may be provided by the DC current to AC voltage transducer, with very little power dissipation, and with complete electrical isolation between the circuit in which the current to be measured is flowing, and the controlling circuit.

Figure 7:
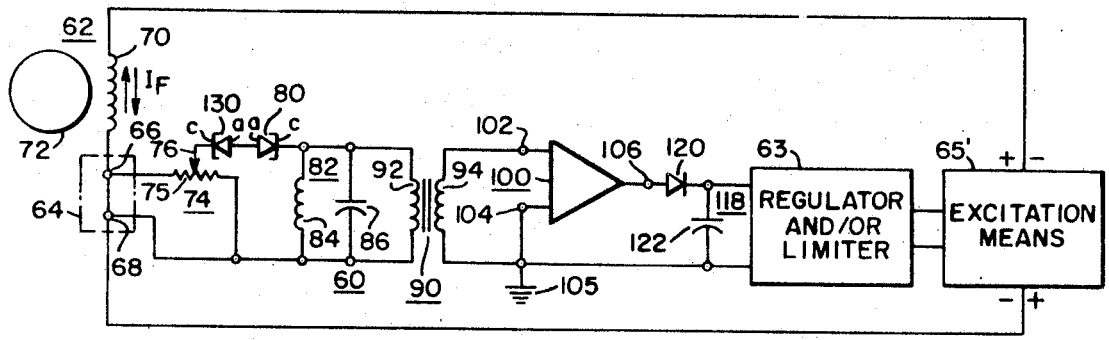
FIG. 7 is a schematic diagram which illustrates the circuit shown in FIG. 4, adapted to provide limiting and/or regulating functions for a dynamoelectric machine, wherein the field voltage may be of either polarity.

FIG. 7 illustrates a modification of the circuit shown in FIG. 6, with like reference numerals in FIGS. 6 and 7 indicating like components. In FIG. 7, the dynamoelectric machine 62 is associated with excitation means 65' which may provide field voltage of either polarity. The only modification required to the circuit is to add a tunnel diode 130 having cathode and anode electrodes $c$ and $a$, respectively, which is serially connected with tunnel diode 80, except poled in the opposite direction. The circuit shown in FIG. 7 will provide the limiting function for either polarity of field voltage, and will also provide a current regulating function for either polarity of field voltage, with a dead band separating the two controlling portions of the transfer curve of the circuit, as illustrated in the graph shown in FIG. 5.

Figure 8:
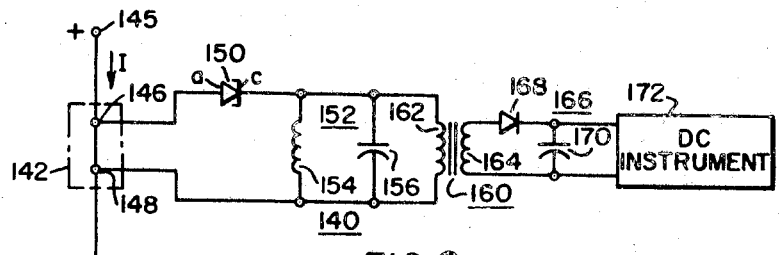
FIG. 8 is a schematic diagram of the circuit shown in FIG. 4, adapted to provide an expanded scale indicating instrument calibrated to indicate the magnitude of the DC current being measured.

FIG. 8 is a schematic diagram which illustrates another embodiment of the invention, wherein the DC current to AC voltage transducer is utilized to provide a self-contained DC ammeter. The DC ammeter includes a tunnel diode oscillator 140, a current shunt 142 having terminals 146 and 148, a transformer 160 having input and output windings 162 and 164, respectively, a rectifier and filter circuit 166 including a rectifier 168 and capacitor 170, and a DC instrument 172. The current shunt 142 is connected serially with the circuit whose DC current is to be measured, at terminals 145 and 147. The tunnel diode oscillator 140 is connected to terminals 146 and 148 of the current shunt 142, with the anode electrode $a$ of tunnel diode 150 being connected to terminal 146 of shunt 142, the cathode electrode $c$ of tunnel diode 150 being connected to tank circuit 152, and with the other side of the tank circuit 152 being connected to terminal 148 of the current shunt 142. As hereinbefore described, the tank circuit 152 includes an inductor 154 and a capacitor 156. The primary winding 162 of transformer 160 is connected across the LC tank circuit 152, and its secondary winding 164 is connected across the rectifier and filter circuit 166. The output of the rectifier and filter circuit 166 is connected to the terminals of the DC instrument 172. While the DC instrument 172 is a DC voltmeter, which is indicating the voltage drop across the shunt 142, it may be calibrated to read DC amperes, and indicate the current flowing between terminals 145 and 147. If an AC instrument is used instead of a DC instrument, the secondary winding 164 of transformer 160 may be applied directly to the AC instrument. The DC current to AC voltage transducer may be mounted directly on the current shunt, if desired, with the transformer 160 providing electrical isolation between the shunt and the meter, protecting operating personnel from shock should the insulation in the instrument fail. The needle of the instrument 172 should be spring biased against the stop, so that it will remain to the left when the tunnel diode just starts to oscillate. As the input signal to the instrument increases, it will result in an upscale deflection of the instrument.

Figure 9:
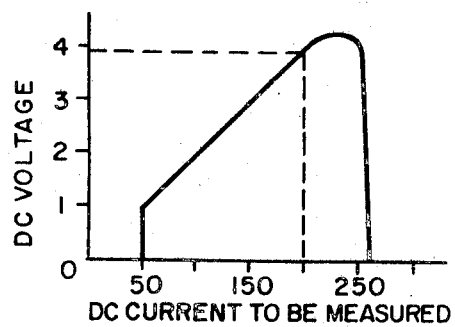
FIG. 9 is a graph illustrating the useful operating range of the indicating instrument shown in FIG. 8.

FIG. 9 is a graph which indicates the useful operating range of the expanded scale DC ammeter circuit arrangement shown in FIG. 8. The DC current to be measured is plotted on the abscissa, and the DC voltage applied to the instrument 172 is plotted on the ordinate. The instrument will not indicate until the DC current magnitude reaches a predetermined magnitude, such as 50 amperes, at which point the instrument will accurately register currents up to approximately 200 amperes. If the circuit in which the current is being measured may exceed the linear range of the apparatus during an overload, clamping means of any suitable type may be connected across the terminals of the current shunt 142, in order to clamp the voltage drop to that maximum value which will prevent the voltage being applied to the instrument from exceeding the linear range of the transducer. For example, one or more semiconductor diodes may be connected across the shunt, with the sum of their threshold values being the clamping voltage.

In summary, there has been disclosed a new and improved DC current to AC voltage transducer which will measure the magnitude of a DC current flowing in the circuit with very little power dissipation, with complete electrical isolation between the input and output of the transducer, and without the need for an external power supply. The transducer has a built in detection or threshold level which may be used for pickup or limiting purposes without the need for auxiliary comparative apparatus, and the transducer has a linear range over which the AC output voltage is directly proportional to the voltage developed across a current shunt due to current flowing therethrough. Thus, the transducer may be used for current regulating purposes. All of the components of the transducer are relatively small and inexpensive, providing a transducer package which is highly efficient, inexpensive to manufacture, and which provides safety for operating personnel due to the electrical isolation between the circuit whose current is being measured, and the output circuit of the transducer.

Since numerous changes may be made in the above described apparatus and different embodiments of the invention may be made without departing from the spirit thereof, it is intended that all matter contained in the foregoing description or shown in the accompanying drawings shall be interpreted as illustrative and not in a limiting sense.

We claim as our invention:
1. A DC current to AC voltage transducer for providing an isolated AC voltage having a magnitude responsive to the magnitude of a DC current, comprising:
   a current shunt adapted for connection in the circuit whose DC current is to be measured, which provides a DC voltage proportional to the magnitude of a DC current flowing therethrough,
   output terminals,
   a first tunnel diode,
   energy storage means,
   said energy storage means and said first tunnel diode being electrically connected across said current shunt, with said first tunnel diode being poled such that the DC voltage across said current shunt forward biases the tunnel diode,
   said energy storage means providing an oscillatory voltage when the DC voltage across said current shunt reaches a predetermined magnitude,
   said energy storage means being selected to provide an oscillatory voltage having a frequency which is in the range where the magnitude of the oscillatory voltage is directly responsive to the magnitude of the DC voltage across said current shunt, over a predetermined range of DC voltage, and
   a transformer having first and second isolated windings, said first winding being connected across said energy storage means, and said second winding being connected to said output terminals.

2. The transducer of claim 1 wherein the energy storage means is an LC tank circuit connected serially with the tunnel diode, across the current shunt.

3. The transducer of claim 1 including a second tunnel diode connected serially and back-to-back with the first tunnel diode, to enable the transducer to provide an AC output voltage responsive to a DC current having a magnitude within the predetermined range, regardless of the direction of the DC current flowing through the current shunt.

4. The transducer of claim 1 including amplifier means and rectifier means, said amplifier means being connected to the output terminals of the transformer, and said rectifier means being connected to rectify the output voltage of said amplifier means, to provide an isolated DC voltage having a magnitude directly responsive to the magnitude of the DC current flowing through the current shunt.

5. The transducer of claim 1 including a load circuit connected to the output terminals, said load circuit being of the type which utilizes the threshold triggering level of the oscillatory voltage provided by the energy storage means as a signal which indicates when the DC current flowing through the shunt reaches a predetermined magnitude.

6. The transducer of claim 1 including a load circuit connected to the output terminals, said load circuit being of the type which utilizes the directly responsive relationship of the magnitude of the oscillatory voltage to the magnitude of the DC current flowing in the current shunt, when the DC voltage across the shunt is in the predetermined range, to regulate the current in the circuit whose current is being measured.

7. The transducer of claim 1 including an AC indicating instrument connected to the output terminals, which is calibrated to directly indicate the magnitude of the DC current flowing in the shunt, when the DC voltage across the current shunt is within the predetermined range.

8. The transducer of claim 1 including rectifier means and a DC indicating instrument, said rectifier means being connected to the output terminals, to provide a DC voltage responsive to the magnitude of the DC current flowing in the current shunt, said DC instrument being connected to said rectifier means, to directly indicate the magnitude of the DC current flowing in the current shunt.

References Cited

UNITED STATES PATENTS

| | | | |
|---|---|---|---|
| 3,212,022 | 10/1965 | Tadama. | |
| 3,310,725 | 3/1967 | Scarr et al. | 321—2 |
| 3,424,981 | 1/1969 | Erdman | 324—118 |
| 3,430,125 | 2/1969 | Povenmire et al. | 321—2 |

FOREIGN PATENTS 1,339,273  8/1963  France.

OTHER REFERENCES

IBM Technical Disclosure Bulletin, Esaki Diode Multimode Oscillator, vol. 3, No. 10, p. 91, March 1961.

IEEE Transactions on Circuit Theory, Maximizing the Frequency of Negative-Resistance Oscillations, vol. 14, No. 1, pp. 48–50, March 1967.

LEE T. HIX, Primary Examiner

W. H. BEHA, JR., Assistant Examiner

U.S. Cl. X.R.

321—44; 324—120; 331—107